(12) United States Patent
Imholt

(10) Patent No.: US 8,257,472 B2
(45) Date of Patent: Sep. 4, 2012

(54) FUEL REMOVAL SYSTEM FOR HYDROGEN IMPLANTED IN A NANOSTRUCTURE MATERIAL

(75) Inventor: Timothy J. Imholt, Richardson, TX (US)

(73) Assignee: Raytheon Company, Waltham, MA (US)

( * ) Notice: Subject to any disclaimer, the term of this patent is extended or adjusted under 35 U.S.C. 154(b) by 663 days.

(21) Appl. No.: 12/406,715

(22) Filed: Mar. 18, 2009

(65) Prior Publication Data

US 2010/0034731 A1 Feb. 11, 2010

Related U.S. Application Data

(60) Provisional application No. 61/188,195, filed on Aug. 7, 2008.

(51) Int. Cl.
*B01D 53/02* (2006.01)
(52) U.S. Cl. .......................................................... 96/143
(58) Field of Classification Search ...................... 96/143
See application file for complete search history.

(56) References Cited

U.S. PATENT DOCUMENTS

| | | | |
|---|---|---|---|
| 6,646,382 B2 | 11/2003 | Tanabe | 315/5 |
| 6,988,925 B2 | 1/2006 | Arthur et al. | 445/46 |
| 7,244,373 B1 | 7/2007 | Anazawa et al. | 252/500 |
| 7,244,374 B2 | 7/2007 | Anazawa et al. | 252/500 |
| 7,247,670 B2 | 7/2007 | Malenfant et al. | 524/496 |
| 7,355,334 B2 | 4/2008 | Anazawa et al. | 313/495 |
| 7,456,565 B2 | 11/2008 | Nomura | 313/497 |
| 2002/0192479 A1 | 12/2002 | Goswami et al. | 428/469 |
| 2003/0035955 A1 | 2/2003 | Yadav | 428/403 |
| 2003/0143402 A1 | 7/2003 | Hon et al. | 428/408 |
| 2003/0144401 A1 | 7/2003 | Ajbani et al. | 524/445 |
| 2004/0016318 A1 | 1/2004 | Angeliu | 75/332 |
| 2004/0042750 A1 | 3/2004 | Gillberg et al. | 385/128 |
| 2004/0099438 A1 | 5/2004 | Arthur et al. | 174/257 |
| 2004/0134565 A1 | 7/2004 | Sun et al. | 148/105 |
| 2004/0180244 A1 | 9/2004 | Tour et al. | 429/13 |
| 2005/0007001 A1 | 1/2005 | Imholt et al. | 313/231.31 |
| 2005/0059765 A1 | 3/2005 | Finch et al. | 524/430 |
| 2005/0092241 A1 | 5/2005 | Colibaba-Evulet | |
| 2005/0147747 A1 | 7/2005 | Yadav | 427/180 |
| 2005/0175885 A1* | 8/2005 | Imholt et al. | 429/40 |
| 2006/0008669 A1 | 1/2006 | Chan | 428/627 |
| 2006/0021510 A1 | 2/2006 | Henley et al. | 96/143 |
| 2006/0111008 A1 | 5/2006 | Arthur et al. | 445/46 |

(Continued)

FOREIGN PATENT DOCUMENTS

WO WO 2004/067714 8/2004

OTHER PUBLICATIONS

PCT Notification of Transmittal of the International Search Report and the Written Opinion of the International Searching Authority, or the Declaration, PCT/US2009/052800, dated Nov. 17, 2009, 13 pages.

(Continued)

*Primary Examiner* — Robert A Hopkins
(74) *Attorney, Agent, or Firm* — Renner, Otto, Boisselle & Sklar, LLP

(57) ABSTRACT

According to one embodiment, a method for removing a gas from a nanostructure material includes a providing gas that is implanted in a carbon nanostructure material. The nanostructure material is subjected to a microwave field to remove the hydrogen from the nanostructure material.

16 Claims, 3 Drawing Sheets

U.S. PATENT DOCUMENTS

| | | | |
|---|---|---|---|
| 2007/0218165 A1 | 9/2007 | Castro et al. | 426/5 |
| 2007/0299518 A1 | 12/2007 | Ruane | 623/11.11 |
| 2008/0045770 A1 | 2/2008 | Sigmund et al. | 588/299 |
| 2008/0123793 A1 | 5/2008 | Loan et al. | 977/902 |
| 2008/0131707 A1 | 6/2008 | Feeney et al. | 428/451 |
| 2008/0275172 A1 | 11/2008 | Wise et al. | 524/424 |

OTHER PUBLICATIONS

Kroto, H. W., et al., "$C_{60}$: Buckminsterfullerene", Letters to Nature, vol. 318, pp. 162-163, Nov. 14, 1985.

Iijima, Sumio, "Helical microtubules of graphitic carbon", Letters to Nature, vol. 354, pp. 56-58, Nov. 7, 1991.

Feynman, Richard P., "There's Plenty of Room at the Bottom", reprinted with permission from Journal of Microelectromechanical Systems, vol. 1, No. 1, pp. 3-9, Mar. 1992.

Ajayan, P. M., "Opening carbon nanotubes with oxygen and implications for filling", Letters to Nature, vol. 362, pp. 522-525, Apr. 8, 1993.

Dujardin, E., et al., "Capillarity and Wetting of Carbon Nanotubes", Science, vol. 265, pp. 1850-1852, Sep. 23, 1994.

Ausman, Kevin D., "Organic Solvent Dispersions of Single-Walled Carbon Nanotubes: Toward Solutions of Pristine Nanotubes", The Journal of Physical Chemistry B, vol. 104, No. 38, pp. 8911-8915, Sep. 28, 2000.

Bahr, Jeffrey L., "Dissolution of small diameter single-wall carbon nanotubes in organic solvents?", Chem. Commun., 2001, pp. 193-194, 2001.

Fujiwara, Akihiko, et al., "Gas adsorption in the inside and outside of single-walled carbon nanotubes", Chemical Physics Letters 336, pp. 205-211, Mar. 16, 2001.

Pirlot, Christophe, et al., "Preparation and Characterization of Carbon Nanotube/Polyacrylonitrile Composites**", Advanced Engineering Materials 2002, 4, No. 3, pp. 109-114, 2002.

Imholt, T. J., et al., "Nanotubes in Microwave Fields: Light Emission, Intense Heat, Outgassing, and Reconstruction", Chem. Mater. 2003, pp. 3969-3970, 2003.

Mamalis, A. G., et al. "Nanotechnology and nanostructured materials: trends in carbon nanotubes", Precision Engineering, 28, pp. 16-30, 2004.

Zhang, Mei, et al., "Multifunctional Carbon Nanotube Yarns by Downsizing an Ancient Technology", Science, vol. 306, pp. 1358-1361, Nov. 19, 2004.

Kang, Inpil, et al., "Introduction to carbon nanotube and nanofiber smart materials", Composites Part B 37, Science Direct, pp. 382-394, 2006.

* cited by examiner

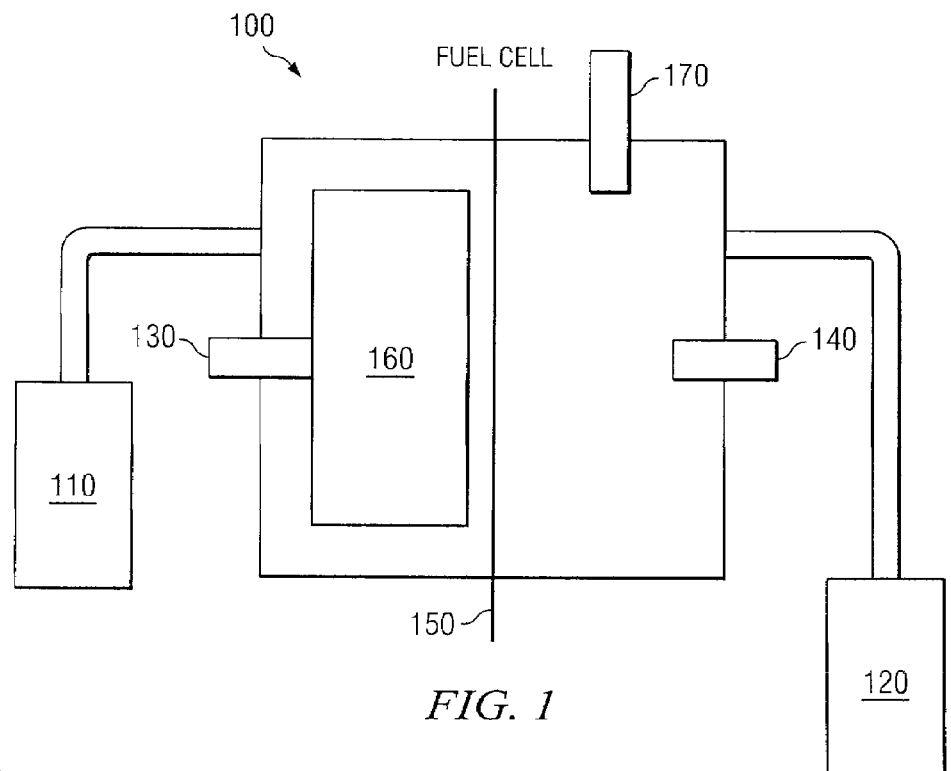
FIG. 1
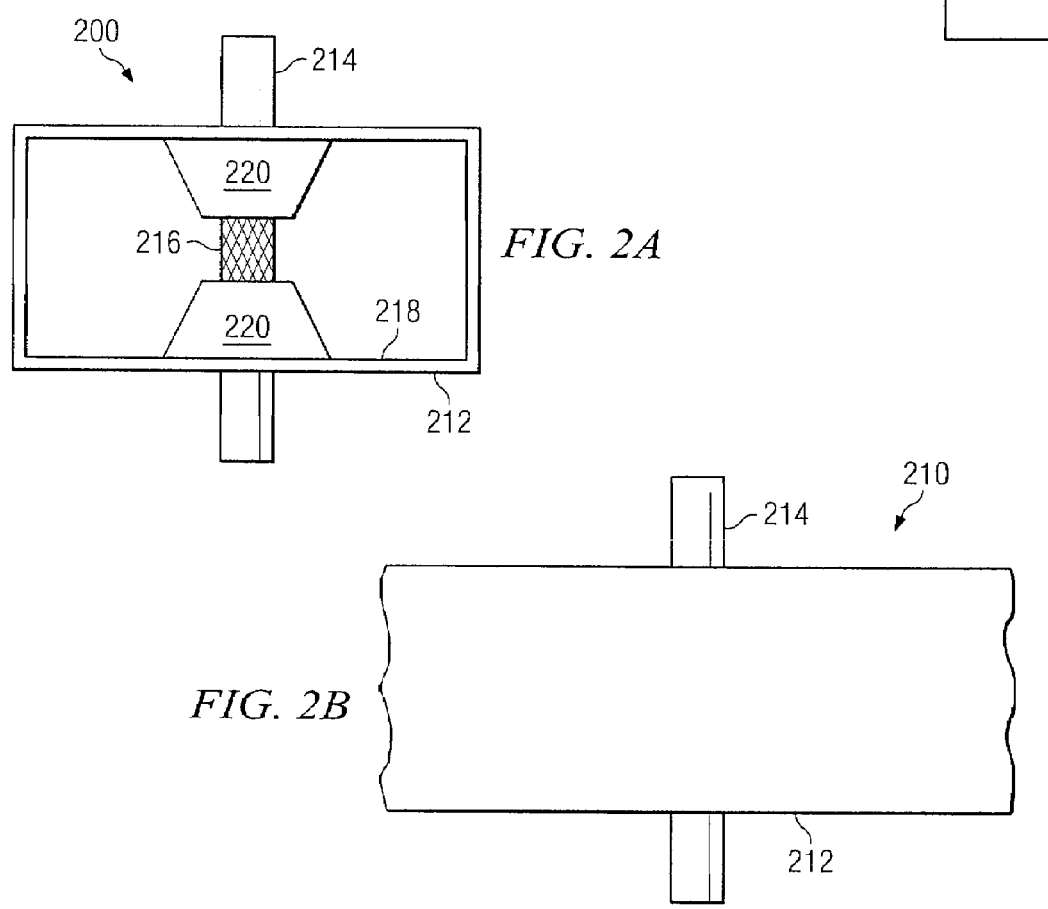
FIG. 2A
FIG. 2B

FUEL REMOVAL SYSTEM FOR HYDROGEN IMPLANTED IN A NANOSTRUCTURE MATERIAL

RELATED APPLICATIONS

Pursuant to 35 U.S.C. §119(e), this application claims priority to U.S. Provisional Patent Application Ser. No. 61/188,195, entitled FUEL REMOVAL SYSTEM FOR HYDROGEN IMPLANTED IN A NANOSTRUCTURE MATERIAL, filed Aug. 7, 2008. U.S. Provisional Patent Application Ser. No. 61/188,195 is hereby incorporated by reference.

TECHNICAL FIELD OF THE DISCLOSURE

This disclosure generally relates to nanostructure materials, and more particularly, to a fuel removal system for hydrogen implanted in a nanostructure material and a method of using the same.

BACKGROUND OF THE DISCLOSURE

Hydrogen may be useful for generating mechanical energy or electrical energy using fuel cells. Many fuel cells use an electrochemical process of combining hydrogen and oxygen to form electricity. Since the byproduct of this electrochemical process is principally water, fuel cells generally provide a relatively environmentally benign form of energy production.

SUMMARY OF THE DISCLOSURE

This disclosure generally relates to nanostructure materials, and more particularly, to a fuel removal system for hydrogen implanted in a nanostructure material and a method of using the same.

According to one embodiment, a method for removing a gas from a nanostructure material includes providing a gas that is implanted in a carbon nanostructure material. The nanostructure material is subjected to a microwave field to remove the gas from the nanostructure material.

Certain embodiments of the disclosure may provide numerous technical advantages. For example, a technical advantage of one embodiment may include the capability to provide a relatively efficient removal system for gases such as hydrogen from nanostructure materials. Other technical advantages of other embodiments may include the capability to remove hydrogen from a carbon nanostructure matrix by heating a portion of the carbon nanostructure matrix using a microwave field. Yet other technical advantages of some embodiments may include the capability to release hydrogen relatively quickly and enable availability of the hydrogen on demand.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

For a more complete understanding of embodiments of the disclosure and its advantages, reference is now made to the following detailed description, taken in conjunction with the accompanying drawings, in which:

FIG. 1 shows a fuel cell according to one embodiment;

FIGS. 2A and 2B show an out-gassing apparatus according to several embodiments;

DETAILED DESCRIPTION OF EXAMPLE EMBODIMENTS

Figure 3:
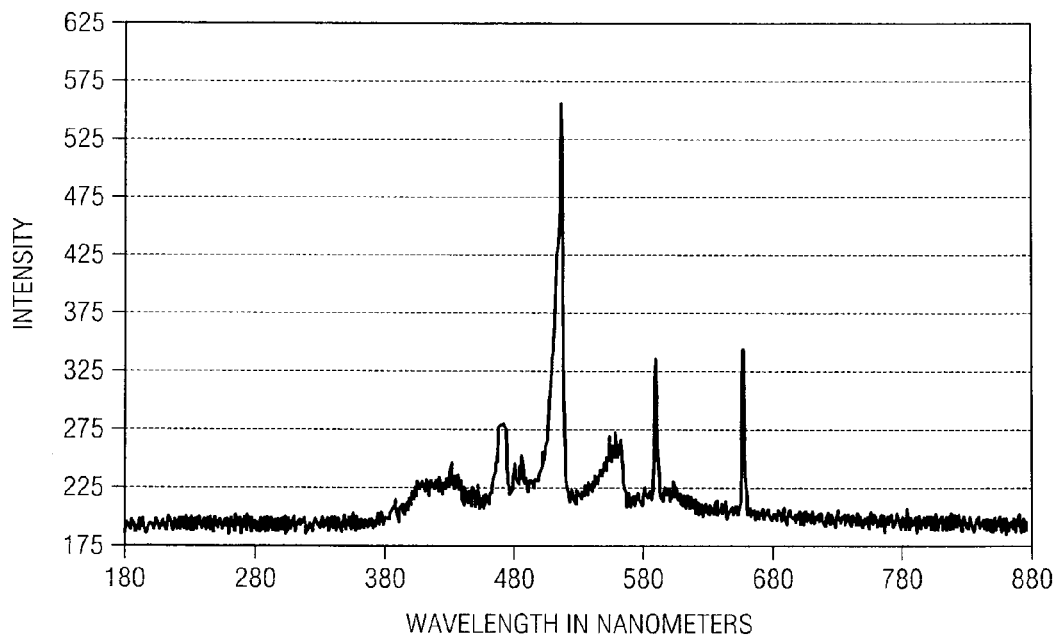
FIG. 3 shows a graph of a light emission spectrum observed due to excitation of the carbon nanostructure material in the microwave field according to one embodiment.

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Fuel Cells

A fuel cell is a device that converts electrochemical energy into some other form. The vast majority of the fuel cells convert hydrogen and oxygen molecules into electrical energy, forming water in the process. Examples of hydrogen-electric fuel cells include polymer electrolyte membrane (PEM) fuel cells, direct-methanol fuel cells, phosphoric acid fuel cells, and molten-carbonate fuel cells. However, other embodiments of a fuel cell may include fuel sources other than hydrogen and mechanisms for generating energy other than electrical conversion.

Teachings of certain embodiments recognize that fuel cells enable certain capabilities not available in some regular batteries. First, batteries typically have all of the chemicals it will ever use stored internally. Second, batteries typically produce electricity by converting these chemicals into some other chemical. Thus, once the battery depletes the chemical source, the battery will no longer produce electrical current. Fuel cells, however, typically store fuel externally. Thus, fuel cells can operate as a source of power virtually forever without being turned off as long as the flow of fuel is maintained and nothing fails.

FIG. 1 shows a PEM fuel cell 100 according to one embodiment. In this embodiment, the fuel Cell 100 features a hydrogen source 110, an oxygen source 120, an anode 130, a cathode 140, a proton exchange membrane (PEM) 150, a catalyst 160, and an outlet 170.

The hydrogen source 110 may include any device operable to deliver hydrogen to the fuel cell 100. The hydrogen source 110 forces pressurized hydrogen gas in the form of $H_2$ into and through the fuel cell 100 on the side containing the anode 130. When the $H_2$ molecules come in contact with the catalyst 160, the $H_2$ splits into H+ ions and two electrons. The electrons then travel through the anode 130 where they make their way through some external circuit (not shown) and then back into the cathode 140 side of fuel cell 100.

The oxygen source 120 may include any device operable to deliver oxygen to the fuel cell 100. The oxygen source 120 forces pressurized oxygen gas in the form of $O_2$ through the catalytic material 160, splitting the $O_2$ into two oxygen atoms.

Each oxygen atom will possess a strong negative charge, attracting two positive hydrogen ions through the PEM 150 and forming water.

The anode 130 enables electrical flow by operating as the negative post of fuel cell 100. The anode 130 conducts the electrons freed from the hydrogen atoms (and molecules) so that they can be used in some fashion externally to the fuel cell. The anode 130 may include a very high surface area device that allows the hydrogen to disperse over the surface.

The cathode 140 enables electrical flow by operating as the positive post of fuel cell 100. The cathode 140 may also include a very high surface area device that allows the oxygen to disperse over the surface. Thus, the cathode 140 may conduct electrons back from the anode 130 circuit. The electrons may then recombine with hydrogen ions and oxygen to form water. The water may then exit the fuel cell 100 via the outlet 170.

The PEM 150 may act as an electrolyte in fuel cell 100. PEM 150 may include a special material that only conducts positively charged ions through it from one side to the other. Thus, the PEM 150 may separate the fuel cell 100 into halves, blocking electrons from moving from one cavity to another and forcing them to travel through the anode.

Embodiments of fuel cell 100 may also include catalytic material or catalyst 160. The catalyst 160 may aid the conversion of hydrogen and oxygen into water. In some embodiments, the catalyst 160 may be made from materials such as platinum thinly coated onto a material such as carbon paper. The catalyst 160 may be fairly rough and porous, thus providing a large surface area at the atomic level. In some embodiments, a large surface area will expose the catalyst 160 to both the hydrogen and oxygen in a large enough quantity so as to keep the fuel cell functioning efficiently.

It should be noted that hydrogen fuel cells are not the only use for stored hydrogen. Rather, embodiments may include other applications for hydrogen under storage.

Fuel Storage

In some settings, hydrogen storage systems may present problematic design considerations because hydrogen exists as a gaseous material at room temperatures. For example, relatively large devices, such as automobiles, may require relatively large and heavy storage vessels. The U.S. Department of Energy has stated that a storage vessel should contain at least 6.7% by weight of hydrogen in order to be considered viable. However, few alternatives meet this commercial viability standard.

For example, one storage alternative includes storing hydrogen in liquid form. However, liquid hydrogen must be stored at less than −423 degrees Fahrenheit in order to maintain a liquid state. Thus, liquid hydrogen is only feasible in a few select environments, such as space systems (e.g., the space shuttle). Otherwise, liquid hydrogen storage systems may require a relatively large amount of energy to keep the temperatures low enough to prevent hydrogen from boiling.

Alternatively, hydrogen may be stored in high pressure tanks. However, the process of pressurizing hydrogen may require significant energy to compress, thus neutralizing the benefit of the release of energy found from the hydrogen.

Various chemical compounds are available that adsorb or absorb hydrogen and reversibly release the hydrogen when heated. These chemical compounds generally provide a relatively dense storage mechanism for hydrogen. Differing types of metallic hydrides that may be doped with sodium, lithium, etc. have achieved varying degrees of success. However, these chemical compounds are relatively heavy and generally require relatively high temperatures to release the hydrogen. Thus, use of metallic hydride compounds may not provide sufficient commercial viability as specified by the U.S. Department of Energy.

Accordingly, teachings of certain embodiments recognize the use of nanostructure materials as hydrogen carriers. Nanostructure materials are relatively lightweight as compared to other alternatives such as metallic hydrides. Additionally, teachings of certain embodiments recognize that nanostructure materials may contain over 50 percent by weight of hydrogen.

FIGS. 2A and 2B show a fuel removal system 200 according to several embodiments. FIG. 2A shows a front view of fuel removal system 200, and FIG. 2B shows a side view. The fuel removal system 200 of this embodiment features a microwave energy generation system 212, a tube 214, a carbon nanostructure material 216, a microwave waveguide 218, and electric field applicators 220.

The microwave energy generation system 212 is operable to generate a microwave field through tube 214. The tube 214 may represent any suitable material adapted to contain carbon nanostructure material 216 inside such that, when a microwave field is generated by the microwave energy generation system 212, the microwave field heats the carbon nanostructure material 216 and the carbon nanostructure material 216 releases hydrogen.

In the particular embodiment shown in FIG. 2A, the microwave energy generation system 212 includes microwave waveguide 218 configured with two opposing electric field applicators 220. The microwave waveguide 218 may represent any device or structure operable to guide microwave waves toward and through nanostructure material 216. For example, in some embodiments, microwave waveguide 218 may include a hallow metallic conductor. Some embodiments may include a rectangular or circular waveguide. Other embodiments may include waveguides of other shapes and sizes.

The microwave energy generation system 212 may be any suitable type operable to develop microwave energy through a container, such as tube 214 shown in the present embodiment. For example, in one embodiment, microwave energy generation system 212 may generate microwave energy at frequencies in the range of, but not limited to, 2.3 to 11 Giga-Hertz. In yet another embodiment, the carbon nanostructure material 216 may be pumped through microwave energy generation system 212 at a specified flow rate. In this manner, hydrogen may be released at a rate at which it is used. Yet other embodiments of microwave energy generation system 212 may generate microwave fields of other frequencies within the microwave portion of the electromagnetic spectrum, including but not limited to 300 mega-Hertz to 300 giga-Hertz.

The carbon nanostructure material 216 may include any suitable material that adsorbs or absorbs sufficient levels of hydrogen. Conceptually, a nanotube is a very small cylinder, typically capped at each end by a hemisphere of carbon atoms. There are two categories of nanotubes: multi-walled nanotubes (MWNT) and single-walled nanotubes (SWNT). MWNTs may be thought of as a number of layers of concentric pipes or tubes. MWNTs also include double-walled nanotubes and triple-walled nanotubes, which may exhibit different properties from SWNTs and other MWNTs.

SWNTs are nanotubes with only a single shell of atoms. The structure of a SWNT can be conceptualized by wrapping a one-atom-thick layer of atoms into a seamless cylinder. In this manner, SWNTs can be thought of as little pipes or tubes with diameters typically ranging from, but not limited to, approximately 0.6 to 5.0 nanometers. The lengths of SWNTs can range from a few hundred nanometers to several centimeters in length.

Currently, various techniques are available for synthesis of SWNTs, including several that grow SWNTs on a substrate or microchip in patterns as required. These techniques may result in differing characteristics, such as length, diameter, and thus their corresponding aspect ratio. Certain types of known SWNTs may adsorb hydrogen at levels ranging from 10 to 35 percent by weight at ambient temperatures and higher percentages are possible.

Although SWNTs share some physical similarities with MWNTs, they exhibit important properties not shared by MWNT variants, such as unique spectroscopical and electrical characteristics. The difference between SWNTs and MWNTs originates at the formation or synthesis level. For example, MWNT synthesis does not require a catalytic material, whereas SWNT synthesis requires a metallic catalyst of some sort to give the nanotubes a nucleation point. In addition, MWNTs form individually, although MWNTs may resemble a tiny plate of spaghetti under electron microscopy. On the other hand, SWNTs rarely form individually, but instead form as entwined nanotubes resembling ropes. These ropes tend to have some number of SWNTs forming strands, which may also resemble a tiny plate of spaghetti under electron microscopy.

These differences in formation or synthesis may cause MWNTs and SWNTs to exhibit unique qualities. For example, SWNTs form with unique electrical properties, with some being very good conductors and others being very good semiconductors. In addition, SWNTs also exhibit higher potential for reversible gas storage.

SWNTs can also achieve a high purity level. Purity in a nanotube refers to how much catalyst material and carbonaceous material has been removed from the sample. In general, nanotubes may form in very impure ways, such as forming with large amounts of unformed carbon or including leftover pieces of catalyst material clinging to the nanotubes. However, once purified, SWNTs may provide a very large surface area as compared to other structures as well as a very high affinity to adsorb hydrogen and other gases.

Both SWNTs and MWNTs exhibit the ability to adsorb gases such as Hydrogen, Nitrogen, and water vapor. The adsorptive nature of both SWNTs and MWNTs depend on various factors, such as degree of crystallinity, tube diameter, tube wall structure, bundling behavior, and Van der Waals forces.

However, removing hydrogen from nanostructure materials can be problematic. For example, hydrogen may be removed by heating the SWNTs to approximately 800 degrees Centigrade above the ambient temperatures. However, tanks for containing SWNTs that are suitable for powering automobiles may be relatively large. Heating these relatively large holding tanks to the desired temperatures may be difficult to accomplish. Specifically, heating large holding tanks of nanotubes may be energy intensive and require a significantly long time using known techniques.

Accordingly, teachings of certain embodiments recognize heating only a portion of the SWNTs at any one time to desorb hydrogen using, for example, the microwave energy generation system 212. Additionally, teachings of certain embodiments recognize that selectively heating only a portion of the SWNTs may provide an efficient mechanism for removing SWNTs, especially from tanks suitably sized for powering relatively large devices, such as automobiles. Certain embodiments of the present disclosure also recognize that the portion of SWNTs may be heated relatively quickly to provide access to hydrogen at the time it is needed. In other words, some embodiments may provide "hydrogen on demand." For example, in some embodiments, the time required to completely remove all of the hydrogen stored within a particular nanotube sample may be on the order of 100 milliseconds.

Teachings of certain embodiments recognize that the SWNTs may be stored in a glass vessel. Certain embodiments recognize that glass, or other highly transparent materials, may allow microwaves to pass through the vessel without being absorbed. Teachings of certain embodiments also recognize that fuel may be removed from the vessel by lower pressure parts of the system and the natural behavior of high and low pressure.

EXAMPLE

A weighed amount of SWNT sample is placed in a 10 centimeter long, closed end, clear quartz tube having an inner diameter of approximately 4 millimeters and an outer diameter of approximately 6 millimeters. Five experiments were conducted using approximately 10 milligrams of SWNTs in its in situ form from the factory, five experiments were conducted using an empty quartz tube, and five experiments were conducted using approximately 10 milligrams of SWNT material implanted using ion implementation, a method available to place more hydrogen inside the SWNTs.

The quartz tube was connected to a stainless steel vacuum system through a glass to metal seal with a standard 1.33 inch conflat flange. A valve was situated between the flange and the main chamber to allow sample exchange. A 150 Liter-per-second (L/s) turbo-molecular pump pumped the main chamber. In all experiments, an open chamber-sample connection gave a pressure lower than $10^{-8}$ Torr. The quartz tube was placed in a waveguide system using a technique in which higher electrical fields were achieved than normal. These experiments were conducted with electrical field values of approximately 10,000 Volts/centimeter (V/cm) with power levels of approximately 0.02 Watts. Upon application of the microwave field, a light emission is seen and measured using an optical fiber with a focusing lens system placed approximately 5 centimeters from the SWNT sample. The fiber was connected to an optical spectrometer that is operative over the range of 180 to 880 nanometers in resolution with a full spectrum acquire time of 100 milliseconds.

Upon application of the microwave field, the SWNT sample is heated so rapidly that a residual gas analyzer (RGA) is not fast enough to show the real time of hydrogen release. In order to accomplish this, the residual gas analyzer was only used to verify that pre-experimental run vacuum conditions remained similar from one experiment to the next. Upon application of the microwave field, a light and plasma emission is seen from the area of the SWNT sample in the vacuum system.

The actual release of hydrogen can be seen in the light spectrum emitted from the region of the SWNTs in the quartz vessel. This light spectra contains components of the various elements contained in the sample, including hydrogen. This hydrogen light spectra consists of the lines as shown in the National Institute of Standards and Technology (NIST) database tables for hydrogen in the range in which data was taken. The lines in this plasma were of the correct ratio to only be from a hydrogen emission. These components of the light emission can be seen to decrease over the time of the experiments indicating that the hydrogen is being out-gassed during the time of the experiments. This would be an obvious conclusion as the turbo-molecular pump is continually on and the main vacuum chamber is open to the small quartz vessel. This would cause a continual decrease in the gasses being removed from the SWNT samples.

The first five experiments consisted of approximately 10 milligram SWNT samples from the factory within the same production run so the amount of stored hydrogen is assumed to be relatively low. The experiments using an empty vessel were conducted in order to show that the light emission and an increase in hydrogen could not be found without the presence of SWNTs, which was also shown to be accurate. The final five experiments used SWNT samples of approximately 10 milligrams each that had been implanted with hydrogen using ion implantation.

A theoretical model used molecular dynamics simulations and ab initio calculations to show that hydrogen atoms with a kinetic energy in the range of 16 to 25 electron-volts (eV) were observed to penetrate into and be trapped inside the SWNTs, as well as enhancing the level of physisorbed hydrogen for different incident energy levels. Because SWNT samples are typically ropes and 10 milligrams may include a relatively large quantity of SWNTs, an incident energy of 50 Kilo-electron-volts (keV) was used. This is higher than the theoretical threshold established by simulation. However, since the hydrogen will decelerate as it passes through individual carbon nanotubes until it is finally captured, the implantation may be possible even at the higher energy levels. The particle rate was approximately 1 particle every $10^{-9}$ seconds, which is slow enough to allow the SWNTs to self repair, a property they are well known to posses. In all experiments, particle counts from $10^{17}$ to $10^{19}$ were found to be captured from the SWNT samples.

It will be seen that relatively high temperatures are reached by the SWNTs. These high temperatures may cause remaining water vapor in the system to be excited and separated into hydrogen (H) and oxygen (O) atomic elements. The purposely loaded sample of SWNTs, therefore show that relatively intense atomic emissions may be seen from these samples. As stated previously, the out-gassing is too rapid for residual gas analyzer measurements. However, the amount of hydrogen removed from the SWNT sample in the condition as delivered from the commercial source was not sufficient to saturate the hydrogen line of the residual gas analyzer. The implanted SWNT samples were sufficient to saturate the instrument requiring two orders of magnitude higher hydrogen pressure in the system.

FIG. 3 shows a light emission spectrum observed due to excitation of SWNT samples in the microwave field. It can be seen that a broad band emission can be used to determine the temperature of the SWNTs as a result of the exposure of the microwave field. This temperature is found by locating the peak of the broad band emission and applying Wein's law of blackbody radiation. This temperature, therefore, may be approximately 5500 to 6000 Kelvin, as verified by a comparison to a National Institute of Standards and Technology traceable source. The remainder of the peaks can all be accounted for by various known emissions of iron (Fe), carbon (C), and hydrogen (H). The iron is the catalyst used in the synthesis of SWNTs, the carbon is inherent, and the hydrogen includes the element under study. The hydrogen lines can be seen to decrease in time in these spectra as they are exposed to the microwave field. This reduction in intensity is due to the out-gassing of hydrogen.

Figure 4:
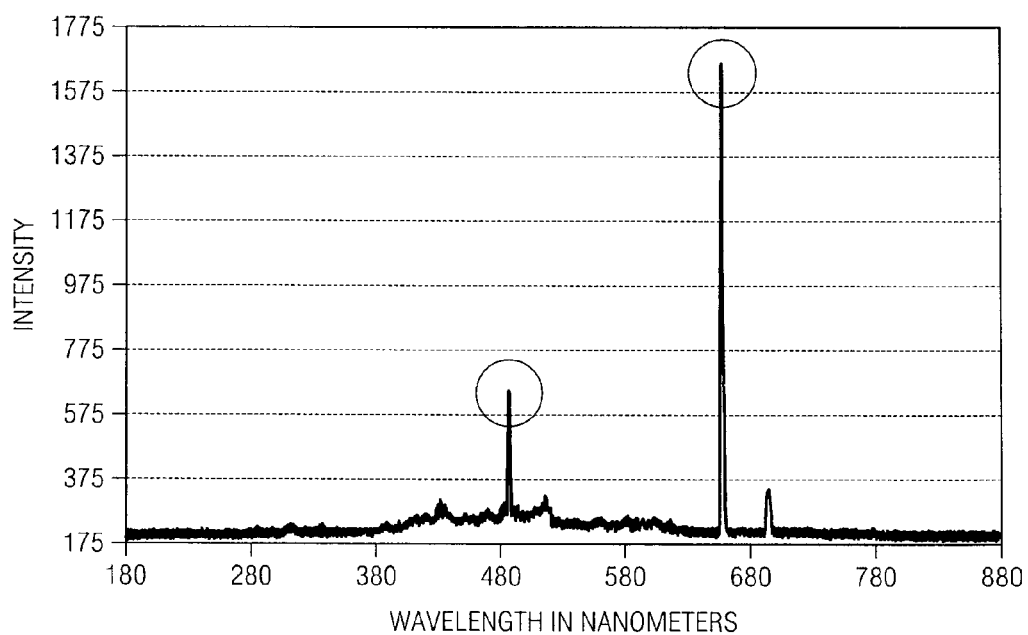
FIG. 4 shows results of experiments conducted with single-walled nanotube samples implanted with hydrogen that are subjected to a microwave field according to one embodiment.

FIG. 4 shows a graph of experiments conducted with SWNT samples implanted with hydrogen that are subjected to the microwave field. The other five experiments with empty vacuum vessels showed no difference in hydrogen levels. The emission of hydrogen can be tracked over the course of the experiment until all hydrogen has been removed, and light emission from these components has ended.

Figure 5:
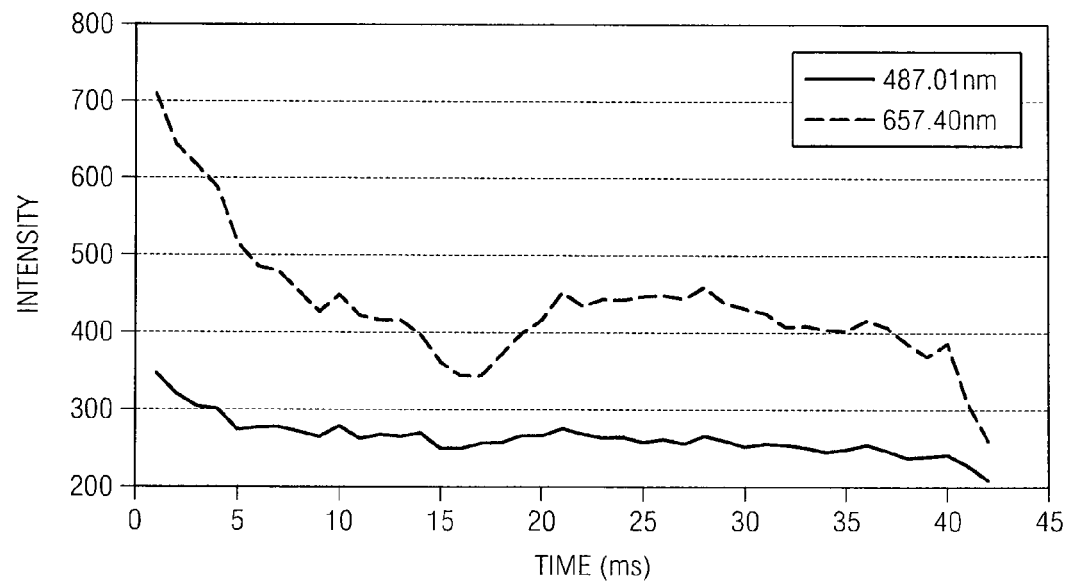
FIGS. 5 and 6 show graphs of the light emission of the carbon nanostructure material that is subjected to the microwave field over a period of time according to one embodiment.
Figure 6:
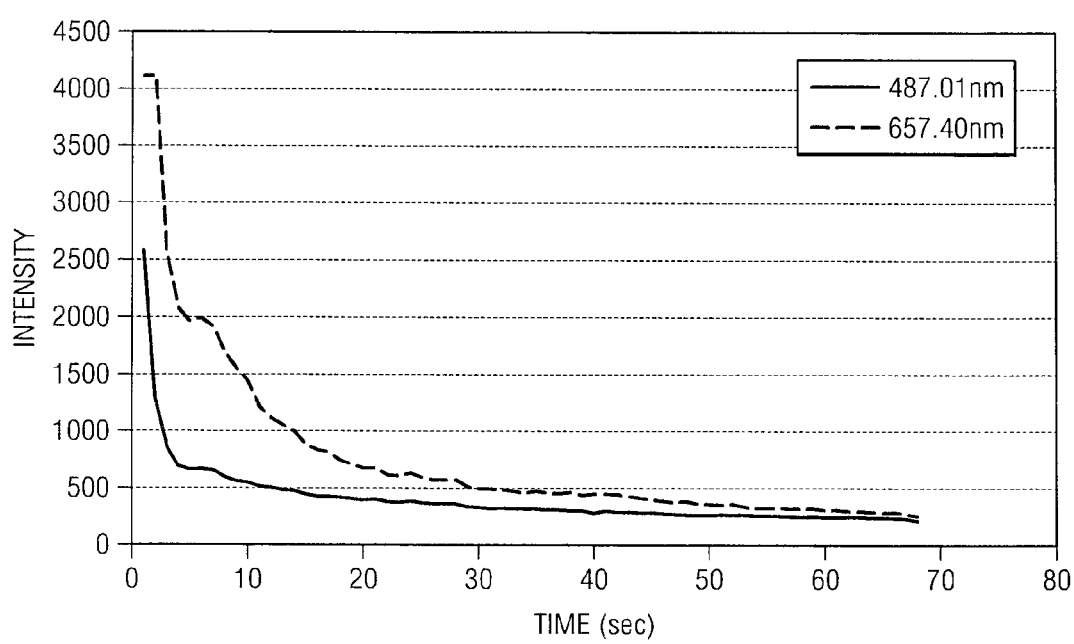

FIGS. 5 and 6 show the light emission of the SWNT samples that are subjected to a microwave field over a period of time. The hydrogen components are visible as soon as the microwave field is incident upon the SWNT samples. FIG. 5 shows the light spectra taken over the first 100 milliseconds of exposure indicating this to be a relatively rapid method for out-gassing of the stored hydrogen. It can also be seen that SWNTs still exist in the sample post-irradiation under scanning electron microscope (SEM) imaging. Micro-Raman studies of desorbed samples have also been conducted and verification of breathing modes indicates SWNT material still in any given post-microwave irradiated sample.

This method is also useful considering that with a microwave field the sample can be selectively heated in much the same way that water and food is heated in a microwave oven, in which the container remains relatively cool. The sample can be completely desorbed in just a few total seconds, indicating that this may be a relatively rapid and energy efficient method of hydrogen (or any gas impurity) removal from SWNTs. The fact that SWNTs remain after desorption indicates that this technique may be used to recycle SWNTs for use multiple times.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

To aid the Patent Office, and any readers of any patent issued on this application in interpreting the claims appended hereto, applicants wish to note that they do not intend any of the appended claims to invoke 6 of 35 U.S.C. §112 as it exists on the date of filing hereof unless the words "means for" or "step for" are explicitly used in the particular claim.

What is claimed is:

1. An out-gassing apparatus for nanostructure material comprising:
   a container adapted to contain gas that is implanted in a carbon nanostructure material;
   a microwave energy generation system operable to deliver microwave energy through the container such that at least a portion of the gas is out-gassed from the carbon nanostructure material; and
   a pump operable to remove the at least a portion of the gas out-gassed from the carbon nanostructure material.

2. The out-gassing apparatus for nanostructure material of claim 1, wherein the microwave energy generation system further comprises two electric field applicators that are configured in a waveguide.

3. The out-gassing apparatus for nanostructure material of claim 1, wherein the microwave energy generation system selectively out-gasses the at least a portion of the gas inside the container by heating a portion of the carbon nanostructure material inside the container.

4. The out-gassing apparatus for nanostructure material of claim 3, wherein the microwave energy generation system produces the at least a portion of the gas from the carbon nanostructure material at a specified flow rate.

5. The out-gassing apparatus for nanostructure material of claim 1, wherein the pump is a turbo-molecular pump.

6. The out-gassing apparatus for nanostructure material of claim 1, wherein the gas is hydrogen.

7. The out-gassing apparatus for nanostructure material of claim 1, wherein the carbon nanostructure material is comprised of single-walled nanotube material.

8. The out-gassing apparatus for nanostructure material of claim 1, wherein the microwave energy generation system generates a microwave field having a frequency in the range of 2.3 to 9.8 Giga-Hertz.

9. A fuel cell comprising:
a container adapted to contain gas that is implanted in a carbon nanostructure material;
a microwave energy generation system operable to develop microwave energy through the container such that the at least a portion of the gas is out-gassed from the carbon nanostructure material; and
a pump operable to remove the at least a portion of the gas out-gassed from the carbon nanostructure material.

10. The out-gassing apparatus for nanostructure material of claim 9, wherein the microwave energy generation system further comprises two electric field applicators that are configured in a waveguide.

11. The out-gassing apparatus for nanostructure material of claim 9, wherein the microwave energy generation system selectively out-gasses the at least a portion of the gas inside the container by heating a portion of the carbon nanostructure material inside the container.

12. The out-gassing apparatus for nanostructure material of claim 11, wherein the microwave energy generation system produces the at least a portion of the gas from the carbon nanostructure material at a specified flow rate.

13. The out-gassing apparatus for nanostructure material of claim 9, wherein the pump is a turbo-molecular pump.

14. The out-gassing apparatus for nanostructure material of claim 9, wherein the gas is hydrogen.

15. The out-gassing apparatus for nanostructure material of claim 9, wherein the carbon nanostructure material is comprised of single-walled nanotube material.

16. The out-gassing apparatus for nanostructure material of claim 9, wherein the microwave energy generation system generates a microwave field having a frequency in the range of 2.3 to 9.8 Giga-Hertz.

\* \* \* \* \*